United States Patent [19]

Wolfe, Jr.

[11] Patent Number: 4,843,124

[45] Date of Patent: Jun. 27, 1989

[54] THERMOPLASTIC ELASTOMERIC BLENDS

[75] Inventor: James R. Wolfe, Jr., Wilmington, Del.

[73] Assignee: E. I. Du Pont de Neumours and Company, Wilmington, Del.

[21] Appl. No.: 56,987

[22] Filed: Jun. 3, 1987

[51] Int. Cl.$^4$ .................. C08L 11/00; C08L 65/00
[52] U.S. Cl. ............................ 525/92; 525/165; 525/173; 525/174
[58] Field of Search ............... 525/92, 177, 173, 174, 525/165

[56] References Cited

U.S. PATENT DOCUMENTS

| | | | |
|---|---|---|---|
| Re. 28,688 | 1/1976 | Cook | 523/200 |
| 4,290,927 | 9/1981 | Tanaka et al. | 525/177 |
| 4,367,316 | 1/1983 | Tanaka et al. | 525/177 |
| 4,670,510 | 6/1987 | Kobayashi et al. | 525/92 |

*Primary Examiner*—Allan M. Lieberman

[57] ABSTRACT

A thermoplastic elastomer blend of 15–90 parts of a continuous matrix of a thermoplastic elastomeric copolyester having a melting point of 100°–200° C. and 10–85 parts of crosslinked polychloroprene present in the form of finely divided particles.

20 Claims, No Drawings

THERMOPLASTIC ELASTOMERIC BLENDS

BACKGROUND

1. Field Of The Invention

The present invention relates to a thermoplastic elastomeric blend of a continuous matrix of a multi-block copolyester elastomer having a melting point of 100° to 200° C. and a crosslinked polychloroprene dispersed therein.

2. Prior Art

U.S. Pat. No. 4,367,316 and U.S. Pat. No. 4,290,927 disclose vulcanized blends of a thermoplastic copolyester or block copolyester elastomer and a vulcanizable synthetic or natural rubber including polychloroprene. The vulcanized blends of these patents have an improved adhesive property with polyester fibers or fabrics, but are not useful as thermoplastic elastomers. They do not exhibit the good reprocessability required of thermoplastic elastomers.

U.S. Pat. No. Re 28,688 discloses heat recoverable articles made from a crosslinked elastomeric component including polychloroprene having incorporated a thermoplastic material. The heat recoverable articles of this patent are not thermoplastic elastomers.

SUMMARY OF THE INVENTION

This invention is directed to a thermoplastic composition comprising about 15–90 parts by weight total polymers of a multi-block copolyester elastomer having a melting point of from about 100°–200° C. and about 10–80 parts by weight total polymers of a crosslinked polychloroprene elastomer dispersed in said copolyester elastomer, said polychloroprene elastomer being crosslinked to an extent such that not more than about 45% by weight of said elastomer is extractable with toluene at 25° C. Preferably, the thermoplastic composition comprises a multi-block copolyester elastomer that consists essentially of (A) repeating high melting point blocks comprising repeating short-chain ester units having the formula

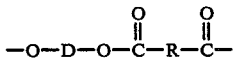

wherein D is a divalent radical remaining after removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer which consists essentially of short-chain ester units having a number average molecular weight of at least 5000 has a melting point about 100° C., (B) repeating low melting point blocks which are derived from compounds containing two hydroxyl or carboxyl groups or mixtures thereof and has a number average molecular weight of 400–4000 and a melting point not greater than 100° C., preferably not greater than 75° C., and (C) an amount of difunctional radicals sufficient to join repeating blocks of (A) and (B) to form a multi-block copolyester elastomer, the weight ratio of (A) to (B) being from about 1:4 to 1:0.1, preferably 1:2 to 1 0.5.

The polychloroprene polymer used in the present invention may either be homopolychloroprene or copolychloroprene. The copolychloroprene polymers contain at least 50% by weight of chloroprene which is the accepted name of 2-chloro-1,3-butadiene.

The thermoplastic elastomer compositions can be prepared by mixing and shearing uncured polychloroprene with a molten multi-block copolyester elastomer, preferably in a high shear mixer, and carrying out curing of the polychloroprene simultaneously with the mixing operation. Alternatively, crosslinked polychloroprene which is in a finely divided form or which can easily be converted to a finely divided form during mixing is mixed with the multi-block copolyester elastomer while shearing. Crosslinked polychloroprene which is in a finely divided form can be prepared by crosslinking the polymer and then grinding it to a fine powder. Crosslinked polychloroprene which can easily be converted to a finely divided form during mixing with the multi-block copolyester elastomer is prepared in the form of a crosslinked polychloroprene latex from which the crosslinked polychloroprene is recovered. In order for the compositions to process well as thermoplastics, the crosslinked polychloroprene component must be dispersed in the multi-block copolyester elastomer during mixing.

DETAILED DESCRIPTION

The thermoplastic multi-block copolyester elastomers used as a component in this invention consist essentially of repeating blocks of repeating short-chain ester units, as described above, which have high melting points (above 100° C.) and repeating low melting point blocks (not greater than 100° C., preferably below 75° C.) which are derived from difunctional compounds having a number average molecular weight of about 400–4000. The low melting point and high melting point blocks are joined together by difunctional radicals which, for example, can be derived by reaction of the high or low melting point blocks with diols, dicarboxylic acids, diepoxides, bis(acyl lactams), and diisocyanates. The high melting point blocks crystallize at useful service temperatures to provide physical crosslinks in the multi-block elastomer while the low melting point blocks provide elastomer characteristics. At processing temperatures, generally of the order of about 100°–220° C., preferably 140°–190° C., the high melting point blocks melt and the polymer is molten.

Multi-block copolyester elastomers of the type described herein which have high melting points, e.g., above about 200° C. do not blend readily with polychloroprene elastomers at safe processing temperatures for the polychloroprene elastomers. Therefore, the multi-block copolyester elastomers used in this invention have melting points no more than about 200° C. If the multi-block copolyester elastomers have melting points below about 100° C, the resulting composition of copolyester elastomer and polychloroprene elastomer will have a limited useful temperature range. Preferably, the melting point of the multi-block copolyester elastomers used as a component of the blend is from about 130°–180° C.

The high melting point blocks which comprise repeating short-chain ester units of the formula

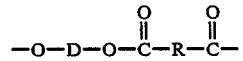

are derived from one or more low molecular weight diols, HODOH, having a molecular weight not greater than 250 and one or more dicarboxylic acids, HOOCR- COOH, having a molecular weight of not greater than 300.

The term "low molecular weight diols" as used herein should be construed to include equivalent ester-forming derivatives, provided, however, that the molecular weight requirement pertains to the diol only and not to its derivatives.

Aliphatic or cycloaliphatic diols with 2-15 carbon atoms are preferred, such as ethylene, propylene, tetramethylene, pentamethylene, 2,2-dimethyltrimethylene, hexamethylene, and decamethylene glycols, dihydroxy cyclohexane, and cyclohexane dimethanol. Unsaturated diols such as butene-2-diol-1,4 can also be used, particularly in minor amounts in admixture with a saturated diol.

The term "dicarboxylic acids" as used herein, includes equivalents of dicarboxylic acids having two functional carboxyl groups which perform substantially like dicarboxylic acids in reaction with glycols and diols in forming multi-block copolyester elastomers. These equivalents include esters and ester-forming derivatives such as acid anhydrides. The molecular weight requirement pertains to the acid and not to its equivalent ester or ester-forming derivative.

Among the aromatic dicarboxylic acids for preparing the copolyester elastomers that are used, those with 8-16 carbon atoms are preferred, particularly the phenylene dicarboxylic acids, i.e., phthalic, terephthalic, and isophthalic acids and their dimethyl esters.

The diol and dicarboxylic acid must be chosen to provide a melting point of at least 100° C. for a polymer having a number average molecular weight of at least 5000 and which is derived exclusively from short-chain-ester units. Preferred high melting point blocks—.are derived from ethylene glycol, 1,4butanediol, or hexanediol by reaction with terephthalic acid alone or in admixture with up to about 30% by weight isophthalic acid or phthalic acid or mixtures thereof Polymers based solely or principally on 1,4-butanediol are especially preferred.

The low melting point blocks in said multi-block copolyester elastomers can be provided by a variety of difunctional compounds having number average molecular weight of 400-4000 which contain hydroxyl groups or carboxyl- groups or mixtures thereof. Suitable compounds for forming low melting point blocks include poly(alkylene oxide) glycols, low melting point polyester glycols, and hydrocarbon glyxols or diacids.

Representative poly(alkylene oxide) glycols have a carbon-to-oxygen atomic ratio of about 2.0–4.3 and a number average molecular weight of about 400–4000 and include poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide. Preferred poly(alkylene oxide) glycols include poly(tetramethylee oxide) glycol having a number average molecular weight of 600–2000, especially 800–1200, and ethylene oxide-capped poly(propylene oxide) glycol having a number average molecular weight of 1500–2800 and an ethylene oxide content of 15-25% by weight.

The required low melting point blocks (i.e., not greater than about 100° C. and, preferably, below about 75° C.) from polyester glycols are either polylactones or the reaction products of low molecular weight diols (i.e., less than about 250) and aliphatic dicarboxylic acids. Representative low melting point polyester glycols are obtained by reaction of diols such as ethylene glycol, 1,4-butanediol, pentanediol, hexanediol, 2,2-dimethyl-1,3-propanediol, and mixtures of ethylene glycol and propylene glycol with diacids such as adipic acid, glutaric acid, pimelic acid, suberic acid, and isosebacic acid. Polylactone glycols derived from unsubstituted and substituted caprolactone or butyrolactone are also useful as low melting point polyester glycols. Preferred polyester glysols include polycaprolactone glycol having number average molecular weights of 800–2500.

Representative hydrocarbon glycols or diacid derivatives which can be used to provide low melting point blocks include polybutadiene or polyisoprene glycols and saturated hydrogenation products of these materials. Dicarboxylic acids formed by oxidation of polyisobutylene/diene copolymers are also useful materials. Dimer acid, particularly the more highly refined grades, is a useful hydrocarbon diacid which can be used alone or in combination with other low melting point compounds such as the poly(alkylene oxide) glycols to provide low melting point blocks.

As previously indicated, multi-block copolyester elastomers used as a component of the thermoplastic compositions of the present invention must have melting points which are not above about 200° C. Since copolyester elastomers based exclusively on butylene terephthalate units or exclusively on ethylene terephthalate units for the high melting point blocks will often melt above 200° C. it may be necessary to introduce minor amounts of a second diol or diacid to lower the polymer melting point. The general relationship between monomer mole fraction and polymer melting point is discussed by Flory, Principles of Polymer Chemistry, page 570, Cornell University Press, 1953. Flory has suggested that the copolymer melting point ($T_m$) depends upon homopolymer's melting point ($T_m$), the homopolymer mole fraction ($N_A$), homopolymer heat of fusion ($\Delta H\mu$) and the gas constant (R) by the following expression:

$$1/T_m - 1/T_m° = -(R/\Delta H\mu)\ln N_A$$

This equation has been found to be reasonably valid for the class of multi-block copolyester elastomers employed in the compositions of this invention. For multi-block copolyester elastomers in which the major short-chain ester units are 1,4-butylene terephthalate units, $T_m° = 234$ ° C. and $\Delta H\mu = 12.1$ cal./g. To prepare copolyester elastomers having melting points no more than about 200° C., it can be calculated that the mole fraction of 1,4-butylene terephthalate units must be less than about 82.5%. The calculated value is supported by the observed melting points of a number of copolyester elastomers based on 1,4-butylene tersphthalate units. Similar calculations can be made for other short-chain units if the homopolymer melting point and heat of fusion are known.

The multi-block copolyester elastomers described herein can be made by procedures known in the art. Elastomers in which the low melting point blocks are provided by poly(alkylene oxide) glycols or hydrocarbon glycols or diacids are readily made by ester interchange reactions followed by polycondensation. Different procedures are required when the low melting point block is provided by a polyester glycol because ester exchange can take place with the high melting point ester blocks which ultimately destroys the blockiness of the polymer.

A typical procedure for preparing elastomers by ester interchange involves heating a dicarboxylic acid or its methyl ester with a poly(alkylene oxide) glycol or hydrocarbon glycol or diacid or mixtures thereof and a molar excess of low molecular weight diol in the presence of a catalyst at about 150°–260° C. and a pressure of 0.05 to 0.5 MPa, usually ambient pressure, while distilling off water formed by esterification and/or methanol formed by ester interchange. The glycol or the diacid that provides the low melting point blocks is incorporated into the polymer through difunctional radicals provided by the dicarboxylic acid in the case of the glycols, or by the low molecular weight diols in the case of the diacids. The particular amount of difunctional radicals incorporated into the polymer to join the high and low melting point blocks will vary and depends on the molecular weights and the ratio of the high and low melting point blocks and the functional groups on the blocks. However, in all cases the difunctional radicals constitute a minor amount of the total weight of the polymer.

Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight multi-block elastomer by distillation of the excess of short-chain diol. This second process stage is known as "poly-condensation".

Additional ester interchange occurs during this poly-condensation which serves to increase the molecular weight of the polymer. Best results are usually obtained if this final distillation or poly-condensation is run at less than about 670 Pa, preferably less than about 250 P, and about 200°–280° C., preferably about 220°–260° C. for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in at amount of about 0.005 to 2.0 percent by weight based in total reactants.

Both batch and continuous methods can be used for any stage of polymer preparation. Polycondensation of prepolymer can also be accomplished in the solid phase by heating divided solid prepolymer in a vacuum or in a stream of inert gas to remove liberated low molecular weight diol.

Several procedures have been used to prepare multi-block copolyester elastomers wherein the low melting point blocks are polyesters as well as the high melting point blocks. One procedure involves carrying out a limited ester interchange reaction in the presence of an exchange catalyst between two high molecular weight polymers such is poly(butylene terephthalate) and poly(butylene adipate). Ester exchange at first causes the introduction of blocks of one polyester into the other polyester chain and vice versa. When the desired multi-block polymer structure is formed the catalyst is deactivated to prevent further interchange which ultimately would lead to a random copolyester without any blockiness. This procedure is described in detail in U.S. Pat. No. 4,031,165 to Saiki et al. Other useful procedures involve coupling of preformed blocks of high and low melting point polyester glycols. Coupling can be accomplished by reaction of a mixture of the blocks with a diisocyanate, as described in European Patent No. 001346 to Huntjens et al. Coupling can also be accomplished by heating the mixed blocks in the presence of terephthaloyl or isophthaloyl bis-caprolactam addition compounds. The caprolactam addition compounds react readily with the terminal hydroxyl groups of the polyester blocks joining the blocks. This coupling method is described in Japanese Pat. No. 700740 (Japanese Patent Publication No. 73/4115). Another procedure of use when the low-melting blocks are to be provided by polycaprolactone involves reacting a preformed high melting point block terminated with hydroxyl groups with epsilon-caprolactam in the presence of a catalyst such as dibutyl tin dilaurate. The caprolactone polymerizes on the hydroxyl groups of the high melting point ester block which groups serve as initiators. The resulting product is a relatively low molecular weight triblock polymer having the high melting point block in the middle with low melting point polycaprolactone blocks on each end. The triblock polymer is hydroxyl terminated and may be joined to give a finished product by reaction with a diepoxide such as diethylene glycol digylsidyl ether, (see, for example, Japanese patent publication No. 83/162654).

The polychloroprene polymer used in the present invention may either be homopolychloroprene or copolychloroprene. The copolycloroprene polymers contain at least 50% by weight of chloroprene which is the accepted name of 2-chloro-1 3-butadiene.

The crosslinked polychloroprene can be prepared from a polychloroprens sol polymer by crosslinking the sol polymer while it is being mixed and sheared in the presence of she thermoplastic multi-block copolyester. Alternatively, crosslinked polychloroprene which is in a finely divided form or which can easily be converted so a finely divided form during mixing is mixed with the multi-block copolyester elastomer while shearing. Crosslinked polychloroprene which is in a finely divided form can be prepared by crosslinking the polymer and then grinding it to a fine powder. Crosslinked polychloroprene which can easily be converted to a finely divided form during mixing with the multi-block copolyester elastomer is prepared in the form of a crosslinked polychloroprene latex from which the crosslinked polychloroprene is recovered. The crosslinked polychloroprene latex can be prepared during the synthesis of the polychloroprene by emulsion polymerization by copolymerizing the chloroprene with a minor amount of a polyfunctional monomer so as to form a polychlsroprene gel polymer directly or it can be prepared sy treating a latex of polschloroprene sol polymer so ss to cause the polychloroprene to become cross-sinked while in the latex form. The chloroprene polymers are prepared by free radical emulsion polymerization of chloroprene or a mixture of monomers consisting of chloroprene and up to s0% by weight based on total of the monomers of one or more ethylenically unsaturated monomers copolymerizable therewith by well-known methods. See, for example, U.S. Patents 2,576 009; 2,831,842; and 2,914,497.

Examples of ethylenically unsaturated monomers copolymerizable with chloroprene are:

vinyl aromatic compounds such as styrene, the vinyl toluenes, and vinyl naphthalenes;

aliphatic conjugated diolefinic compounds such as 1,3-butadiene, isoprene
2,3-dimethyl-1,3-butadiene, and
2,3-dichloro-1,3-butadiene;
vinyl ethers, esters, and ketones such as methyl vinyl ether, vinyl acetale, and methyl vinyl ketone;
esters, amides, and nitriles of acrylic acid and methacrylic acid such as ethyl acrylate, methyl methacrylate methacrylamide, and acrylonitrile.

Examples of polyfunctional monomers which will cause chain-branching leading to crosslinking when copolymerized with chloroprene are polyfunctional esters and amides of acrylic and methacrylic acid such as ethylene simethacrylate, 1,6Lhexamethylene diacrylate, ethylene diacrylate 1,6-hexamethylene bisacrylamide, pentaerythritol retramethacrylate, and tetramethylene diacrylate. Sufficient polyfunctional comonomer should be present such that the resulting crosslinked polychloroprene copolymer after recovery from the latex is substantially insoluble in benzene or toluene. Alternatively the latex of polychloroprene gel polymer can be prepared in a stepwise fashion by first polymerizing the chloroprene monomer in the presence of a dilakyl xanthogen disulfide and then treating the resulting latex with amines to form a latex of benzene-insoluble gel polymer as described in U.S. Pat. Nos. 3,300,433; 3,317,451; and 3,392,134.

And of the conventional emulsifying agents MAY be used in making the monomer emulsion. These include the water-soluble salts particularly the sodium, potassium or ammonium salts, of compounds of the following types: long-chain fatty acids; rosins and rosin derivatives such as wood rosin, tall oil rosin, disproportionated rosin, or partially polymerized rosin; higher alcohol sulfates; aryl sulfonic acids, such as nonylbenzene sulfonic acid; and formaldehyde condensates of aryl sulfonic acids such as the condensation product of formaldehyde and napthalene-sulfonic acid.

The conventional free-radical type polymerization initiators are used, which are compound capable of yielding free radicals in the polymerization system. These include, for example, compounds containing the peroxy radical. Examples of these are hydrogen peroxide, cumene hydroperoxide, and water-soluble salts of persulfuric acid such as sodium persulfate, potassium persulfates, and ammonium persulfate. Other types of free-radical polymerization initiators which may be used are the azo compounds disclosed in U.S. 2,471,959, such as 2,2,-azobis(2-methylpropionitrile). Still others are the nitrogen fluorides or the sodium, potassium, or ammonium ferricyanides. In carrying out the polymerization, an aqueous solution of the polymerization initiator is usually added to the polymerization system at such a rate that the desired rate of polymerization is maintained. Rate of polymerization is usually determined by measuring the specific gravity of the emulsion during the polymerization.

The polymerization may be carried out between 0° C. and 60° C., preferably between 40° C and 58° C.

The pH of the polymerization system may be slightly acidic, neutral, or in the alkaline range. It is preferred to conduct the polymerization at a pH ranging from 7 to 13.5.

Polymerization may be stopped by the addition of conventional 'short-stopping' agents such as a mixture of phenothazine and 4-tert-butycatechol, as described in U.S. Pat. No. 2,576,009. Excess monomer, if present, may be removed by steam stripping as disclosed in U.S. 2,467,769.

As usual in chloroprene polymerizations, oxygen is excluded from the atmosphere in the polymerization vessel. This is conveniently done by sweeping the reaction vessel with a stream of an inert gas such as nitrogen and maintaining the atmosphere of the gas above the polymerization medium.

The polymer content or the final latex is not critical but usually ranges from about 35 to about 55 percent of the weight of the polymerization system.

The thermoplastic multi-block copolyester elastomers in amounts of about 15–90 parts by weight total polymers are blended with about 10–85 parts by weight total polymers of polychloroprene. Preferably 30–70 parts copolyester by weight total polymers are blended with about 30–70 parts polychloroprene by weight total polymers.

The mixing of the thermoplastic multi-block copolyester elastomers with the polychloroprene elastomers is accomplished by any one of a number of conventional techniques, for example, in a Banbury mixer, two-roll mill, or extruder. This mixing is done at a temperature high enough to soften the polymers for adequate mixing, bus not so high as to degrade the polychloroprene. Generally, mixing is done at a temperature range from about 100°–220° C. preferably 140°–190° C. Mixing is carried out for a time sufficient to allow for crosslinking when polychloroprene sol polymer is used and for shearing and dispersing the polychloroprene substantially uniformly throughout the copolyester. Adequacy of mixing can be determined by observing the prosessability of the compositions by means of a piston rheometer. If the degree of mixing is inadequate as indicated by poor extrudability at processing temperatures, additional mixing at the original mixing temperature or st lower temperatures can be employed to further comminute and disperse the crosslinked polychloroprene in she multi-block copolyester elastomer in order to obtain satisfactory thermoplastic processability.

An important aspect of the process for making the thermoplastics composition is crosslinking the polychloroprene component of the composition. When polychloroprene sol polymer is mixed with the multi-block copolyester elastomer, it is necessary to crosslink the polychloroprene elastomer while it is being mixed and sheared in the presence of the multi-block copolyester elastomer. Crosslinking is carried out using any one or more of the well-known crosslinking systems for polychloroprens. Typical crosslinking systems consist of an acid acceptor and a vulcanizing agent. Representative acid acceptors include metal oxides such as magnesium oxide, zinc oxide, red lead, and litharge. Representative vulcanizing agents include thioreas such as ethylenethiourea, trimethylthiourea, diethylthiourea and dibutylthiourea; thiuram sulfides such as tetramethylthiuram monosulfide, tetramethylthiuram disulfide, and tetraethylthiuram disulfide; sulfur and organosulfur compounds such as benzothiazyl disulfide; meta-phenylene-bismaleimide; and organic nitrogen compounds such as hexamethylenetetramine, di-ortho-tolylguanidine, and the di-ortho-tolylguanidine salt of dicatechol borate. Representative crosslinking systems for the polychloroprene elastomers include:

magnesium oxide plus zinc oxide plus a thiourea such as ethylenethiourea; magnesium oxide plus zinc oxide plus hexamethylenetetramine plus tetramethylthiuram disulfide plus 4000 molecular weight polyethylene glycol; magnesium oxide plus zinc oxide plus hexamethylenetetramine plus di-ortho-tolyguanidine plus tetraethylthiuram disulfide magnesium oxide plus zinc oxide plus the di-ortho-tolylguanidine salt of dicatechol borate; magnesium oxide plus zinc oxide plus benzothiazyl disulfide plus meta-phenylene-bismaleimide.

The crosslinking of the polychloroprene elastomer can be carried out before or concurrently with mixing the elastomer with the multi-block copolyester elastomer. If the polychloroprene elastomer is crosslinked while in the latex, it is necessary to isolate the crosslinked polychloroprene elastomer from the latex and than mix it with the multi-block copolyester elastomer under such conditions of shear and time so as to disperse the crosslinked polychloroprene substantially uniformly throughout the copolyester. If polychloroprene sol polymer is recovered from the latex and it is crosslinked prior to mixing wits the multi-block copolyester elastomer, it is necessary to pulverize or power the crosslinked polychlosoprene before mixing it with the copolyester. When precrosslinked polychloroprene is mixed with the copolyester elastomer, no cure is involved during mixing.

The term crosslinked refers to a degree of crosslinking such that the polychloroprene elastomer when mixed with the multi-block copolyester elastomer yields a thermoplastic elastomeric composition in which not more than 45% by weight of the polychloroprene elastomer is extractable with toluene at 5° C., the balance, i.e., at least about 55% by weight of the polychloroprene is crosslinked to the point of insolubility. To quantify the degree of crosslinking the amount of insoluble, and hence crosslinked, polymer is determined by leaching a sample of the polymer mixture is toluene at 25° C. for 48 hours, isolating the insoluble portion, weighing the dried residue, and making suitable corrections based upon knowledge of the composition. For example, the weight of components soluble in toluene such as extenders and processing oils are subtracted from the initial weight; and components insoluble in toluene, such as pigments, fillers, polyester elastomer, etc. are subtracted from both the initial and final weight. Small amounts of the order of 3–4 percent by weight of the multi-block copolyester elastomer are soluble in toluene at 25° C. and such amounts should be taken into consideration when determining s-he degree of crosslinking of the polychloroprene elastomer. The insoluble polymer recovered is reported as percent by weight gel content. For purposes of the subject invention, the polychloroprene elastomer component of the compositions needs to be crosslinked so that not more than 45% by weight of the elastomer is extractable with toluene at 25° C. Thus the polychloroprene has a gel contest of at least 55% by weight. The conditions under which this crosslinking is carried out, i.e., type and quantity of crosslinking agent, crosslinking time and temperature, to arrive at a polymer having a gel content within this operable range, can be determined empirically and is sell known in the art of making polychloroprene elastomers.

Although not essential components of the composition of this invention, preferably, especially from a cost standpoint, various amounts of any number of conventional fillers or compounding ingredients normally used with elastomers may be admixed with the compositions of this invention. Examples of such ingredients include extending oils; fillers such as various carbon blacks, clays, silica, alumina, and calcium carbonate; pigments such as titanium dioxide; antioxidants; antidegradants; tackifiers; processing aids such as lubricants and waxes; and plasticizers such as dialkyphthalates, trialxylmellitates, and polyester oligomers. It is preferable to add processing oils and fillers to she thermoplastic composition to improve its processing characteristics and the amounts used depend, at least in part, upon the quantities of other ingredients in the composition and the properties desired from the composition.

The compositions of the present invention are melt processible using conventional plastic processing equipment. Articles molded from the thermoplastic elastomeric compositions of the present invention exhibit properties generally only associated with vulcanized rubber. For example, these compositions have resistance to compression set values of about 20 to 65 percent (at 70° C.); and elongation at break values of 100 to 800 percent. The compositions exhibit excellent low temperature flexibility which makes them particularly useful for cold weather applications. Various uses for she thermoplastic elastomer compositions include wire coverings, seals and gaskets, automotive parts, sheet liners, and packaging films. They can be used to coat fabric, industrial belts, and various hard surfaces by extrusion coating, for example, on substrates made from polyester, polyamide, polyimide, or metal fibre or fabric reinforcement. They find utility in adhesive and sealant applications, as well as for modification of other polymer systems.

Further, thermoplastic elastomeric compositions within the scope of this invention can be fabricated into tubing for laboratory, medical, and industrial uses. Such tubing could also be used as the inner tube of reinforced hoses, wherein the extruded tube is overlaid with wire or textile cords, applied as a spiral, knit, or braid. Optionally, a polymeric covering may be applied (extruded or spiral wound calendered sheet) over the reinforced tubing to provide protection from the working environment and mechanical abuse. Compositions within the scope of this invention can be used as the protective covering of reinforced tubes of similar sr different composition.

The following examples, in which parts are by weight unless otherwise indicated, are illustrative of the present invention and show advantages resulting therefrom.

EXAMPLES

General Procedures Used to Prepare Compositions

The polymers employed in the preparation of compositions were dried for 2 hours at 120° C. in a vacuum oven under reduced pressure with a nitrogen bleed before mixing. The polymers to be mixed were changed to a Haake Rheocord Torsue Rheometer (Rheocord Model 600) equipped with cam-style blades and preheated to 160° C. Mixer speed was maintained at 100 rpm during the mixing procedure. The polymers were mixed and sheared until the temperature of the mixture ross to 160° C. after which mixing and shearing was continued for the times reported in the Examples. The temperature of the polymer mixtures usually rose above 160° C. during the mixing and shearing procedures. A nitrogen atmosphere was maintained in the mixing chamber while the polymers were being mixed and sheared. The polymer mixtures were removed from the Haake mixer and milled for about 3 minutes on a hot, 2-roll rubber mill before being returned to the Haake mixer and remixed and sheared as. 160° C. for the times reported in the Examples.

Polymer Test Methods

The specimens were cut from slabs compression molded at the temperatures specified in the examples. The test methods used were:

| | |
|---|---|
| tensile strength at break at 8.5 mm/s | ASTM D412 |
| elongation at break at 8.5 mm/s | ASTM D412 |
| Compression set after 22 hr/70° C., method B | ASTM D395 |
| Clash-Berg $T_{10000}$ | ASTM D1043 |
| volume swell in ASTM #3 oil | ASTM D471 |

Stress-strain measurements were run on test specimens approximately 0.6 mm in thickness using nonstandard dumbbells having the following dimensions using the standard dumbbell nomenclature or ASTM D412:

A=13 mm, C=83 mm, L=44 mm, W=6.4 mm

Compression sets were measured using 13 mm diameter discs diced out of about 2 mm thick slabs and piled up to a thickness of about 13 mm. Specimens for oil-swell tests were cut from about 0.8 mm thick slabs which were remolded from cut-up pieces of previously molded slabs in order to demonstrate the remoldability and thus the thermoplasticity of the compositions. All tests were run in duplicate sr triplicate.

Polymers Employed

The copolyester elastomer was prepared by reacting a mixture of 40.2 parts dimethyl tersphthalate, 11.7 parts dimethyl isophthalate, 44.9 parts poly(tetramethylene oxide) glycol having a number average molecular weight of about 1000, 20 parts of butanediol, and 0.05 part of trimellitic anhydride in the presence of 0.1 part tetrabutyl titanate catalyst. The reaction conditions were substantially identical to those disclosed in Example 1 or U.S. Patent 3,651,014. The copolyester elastomer had Shore D hardness 40, specific gravity 1.17, melt index at 190° C. of 5 g/10 min., and melting point 168° C.

The polychloroprene gel polymer was prepared by free-radical emulsion copolymerization of a mixture of 96 parts of 2-chloro-1,3-butadiene, and 4 parts of ethylene dimethacrylate. The polychloroprene gel polymer was recovered from the aqueous latex and dried before use.

The polychloroprene sol polymer was prepared by free-radical emulsion polymerization of 2-chloro-1,3-butadiene in the presence of chain-transfer agent to control the viscosity of the final product. The polychloroprene sol polymer was recovered from the aqueous latex and dried before use. The polychloroprene sol polymer has a Mooney viscosity, ml 1+4 at 100° C., of 42-51 and a specific gravity of 1.23.

Example 1

Polychloroprene gel polymer and multi-block copolyester elastomer were mixes and sheared for 10 minutes in a Haake mixer, milled on a hot rubber mill and then remixed and sheared for.- 3 minutes as described. Test samples were compresslion molded at 200° C. Shown in Table 1 are a series of compositions prepared as described above and ranging from 90 parts of copolyester elastomer and 10 parts of polychloroprene gel polymer to 20 parts of copolyester elastomer and 80 parts of polychloroprene gel polymer. The compositions are labeled 1G to 8G. Compositions 1G to 8G are illustrative of the present invention.

Shown in Table 1 for comparison purposes are the properties of compositions prepared by mixing copolyester elastomer with polychloroprene sol polymer (compositions 1S to 8S) using the mixing procedures described for the compositions containing polychloroprene gel polymer.

Compositions IG to 8G which are illustrative of the present invention, excel relative to compositions IS to 8S in resistance to compression set and in resistance to oil swell Both series of compositions were remoldable demonstrating their thermoplastic character. Compositions 1G to 8G exhibit excellent flexibility at low temperatures as evidenced by the low temperature value of their Clash-Berg $T_{10000}$.

TABLE 1

| Composition | Multi-Block Copolyester Elastomer, Wt. % | Polychloroprene Wt. % | Polychloroprene Type | Comp. Set B 22 Hr./70° C. % |
|---|---|---|---|---|
| 1G | 90 | 10 | gel | 61 |
| 1S | 90 | 10 | sol | 64 |
| 2G | 80 | 20 | gel | 60 |
| 2S | 80 | 20 | sol | 64 |
| 3G | 70 | 30 | gel | 55 |
| 3S | 70 | 30 | sol | 67 |
| 4G | 60 | 40 | gel | 50 |
| 4S | 60 | 40 | sol | 65 |
| 5G | 50 | 50 | gel | 48 |
| 5S | 50 | 50 | sol | 73 |
| 6G | 40 | 60 | gel | 40 |
| 6S | 40 | 60 | sol | 72 |
| 7G | 30 | 70 | gel | 32 |
| 7S | 30 | 70 | sol | 67 |
| 8G | 20 | 80 | gel | 24 |
| 8S | 20 | 80 | sol | 55 |

| Composition | ASTM #3 Oil 7 Days/100° C., % Vol Swell | Tensile Strength at Break MPa | Elongation at Break % | Clash-Berg $T_{10000}$, °C. |
|---|---|---|---|---|
| 1G | 28 | 21 | 790 | −47 |
| 1S | 33 | 33 | 880 | (a) |
| 2G | 33 | 22 | 775 | −46 |
| 2S | 40 | 25 | 825 | (a) |
| 3G | 39 | 14 | 555 | −44 |
| 3S | 49 | 24 | 835 | (a) |
| 4G | 45 | 12 | 470 | −44 |
| 4S | 62 | 18 | 785 | (a) |
| 5G | 52 | 11 | 440 | −43 |
| 5S | 80 | 14 | 705 | (a) |
| 6G | 59 | 8.3 | 370 | −41 |
| 6S | 107 | 10 | 460 | (a) |
| 7G | 66 | 6.4 | 290 | −41 |
| 7S | 131 | 11 | 540 | (a) |
| 8G | 72 | 4.1 | 210 | −39 |
| 8S | 139 | 10 | 495 | (a) |

(a) Not Measured

EXAMPLE 2

A series of compositions containing varying amounts of the multi-block copolyester and polychloroprene sol polymer were prepared. Crosslinking agents were added during mixing and shearing to effect crosslinking of the polychloroprene polymer in compositions 9X–12X. No crosslinking agents were added to compositions 5S–8S.

The compositions were prepared by mixing together and shearing for 11 minutes in a Haake mixer the polymers plus 5 parts per 100 parts total combined polymer of magnesium oxide, 4 parts zinc oxide, and 2 parts of a 3/1 blend of ethylenes-hiourea and ethylene-propylene-diene terpolymer. The compositions were removed from the mixer and then reinserted in the mixer and mixed and sheared for s-n additional 2 minutes. The polymer proportions and the properties of the compositions are listed is Table 2. Compositions 9X-12X of Table 2 are illustrative of the present invention. Compositions 9X-12X of Table 2 excel in resistance to compression set and oil swell relative to the analogous polymer blends 5S-8S which are included only for comparison purposes and are not part of the present invention. Compositions 9X-12X were remoldable demonstrating their thermoplastic character even though there is a substantial amount of crosslinked polychloroprene elastomer in them.

Compositions 9X-12X exhibit excellent flexibility at low temperatures as evidences by the low temperature value of their Clash-Berg T1000.

When compositions containing the ingredients listed for 9X-12X were prepared by mixing on a rubber mill at room temperature and these curing in a mold for 15 minutes at 160° C., the resulting compositions were not thermoplastic. They could not be remolded at 200° C. to form slabs substantially free of flaws caused by poor flow and poor knitting. In order for the compositions containing crosslinked neoprene sol polymer to be thermoplastic, the compositions must be subjected to mixing and shearing during or after crosslinking the neoprene sol polymer or the crosslinked neoprene sol polymer must be converted to a fine powder before mixing with the polyester.

TABLE 2

| Composition | Multi-Block Copolyester Elastomer, Wt. % | Polychloroprene Sol Polymer, Wt. % | Comp. Set B 22 Hr./70° C. % |
|---|---|---|---|
| 9X | 50 | 50 | 64 |
| 5S | 50 | 50 | 73 |
| 10X | 40 | 60 | 60 |
| 6S | 40 | 60 | 72 |
| 11X | 30 | 70 | 47 |
| 7S | 30 | 70 | 67 |
| 12X | 20 | 80 | 44 |
| 8S | 20 | 80 | 55 |

| Composition | ASTM #3 Oil 7 Days/100° C., % Vol Swell | Tensile Strength at Break MPa | Elongation at Break % | Clash-Berg $T_{10000}$, ° C. |
|---|---|---|---|---|
| 9X | 48 | 12 | 420 | −41 |
| 5S | 80 | 14 | 705 | (a) |
| 10X | 56 | 11 | 390 | −41 |
| 6S | 107 | 10 | 460 | (a) |
| 11X | 63 | 6.3 | 180 | −39 |
| 7S | 131 | 11 | 540 | (a) |
| 12X | 74 | 4.3 | 185 | −40 |
| 8S | 139 | 10 | 495 | (a) |

(a) Not Measured

Example 3

Compositions were prepared from the multi-block copolyester and the polychloroprene sol polymer. The compositions contained filler, crosslinking agents and, in one composition, oil. The filler was carbon black and the oil was Sundex 790 aromatic oil ASTM D2226.

The component proportions and the properties of the compositions are listed in Table 3. The compositions were prepared by mixing and shearing the components together in a Haake mixer for 8 minutes. The compositions were then mixed for about 3 minutes on a 2-roll rubber mill heated to about 160° C and then were mixed and sheared for an additional 2 minutes in a Haake mixer. The excellent properties of the compositions listed in Table 3 demonstrate that the invention can be carried out in the presence of filler and oil additives.

TABLE 3

|  | 13X | 14X |
|---|---|---|
| Composition |  |  |
| Copolyester elastomer | 40 | 40 |
| Polychloroprene sol polymer | 60 | 60 |
| Carbon black ASTM N744 | 30 | 30 |
| Aromatic oil ASTM D2226, Type 102 |  | 15 |
| Zinc oxide | 5 | 5 |
| Magnesium oxide | 4 | 4 |
| Ethylene thiourea 75% in EPDM | 2 | 2 |
| Properties |  |  |
| Compression set, % | 61 | 62 |
| Shore A hardness | 82 | 81 |
| ASTM #3 oil 7 days/100° C., % vol swell | 52 | 45 |
| Tensile strength, MPa | 8.5 | 10 |
| Elongation at break, % | 115 | 250 |

1. A thermoplastic composition comprising about 15 to 90 parts by weight per 100 parts polymer present of a continuous phase multi-block copolyester elastomer having a melting point of from about 100°–200° C., consisting essentially of (A) repeating high melting point blocks comprising repeating short-chain ester units having the formula:

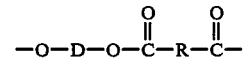

wherein D is a divalent radical remaining after removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer which consists essentially of short-chain ester units having a number average molecular weight of at least 5000 has a melting point above 100° C., (B) repeating low melting point blocks which are derived from compounds containing two hydroxyl or carboxyl groups or mixtures thereof and have a number average molecular weight of 400–4000 and a melting point not greater than 100° C., and (C) an amount of difunctional radicals sufficient to join repeating blocks of (A) and (B) to form a multi-block copolyester elastomer, the weight ratio of (A) to (B) being from about 1:4 to 1:0.1. and about 10–85 parts by weight per 100 parts polymer present of a crosslinked polychloroprene which is either homopolychloroprene or a copolymer of chloroprene and up to 50 weight percent of an ethylenically unsaturated monomer, present in the form of finely divided particles being dispersed in said copolyester elastomer, said polychloroprene being crosslinked to an extent such that not more than about 45% by weight of said polychloroprene is extractable with toluene at 25° C.

2. The composition of claim 1 wherein the crosslinking of the polychloroprene took place while mixing and shearing the composition in the molten state.

3. The composition of claim 2, wherein the copolyester has high melting point blocks derived from ethylene glycol or 1,4-butanediol and terephthalic acid or mixtures there of containing up to about 30% by weight isophthalic or phthalic acid.

4. The composition of claim 2, wherein the copolyester has low melting point blocks derived from poly(alkylene oxide) glycols having a carbon to oxygen ratio of about 2.0–4.3 and a number average molecular weight of from about 400–4000.

5. The composition of claim 4 wherein the poly(alkylene oxide) glycol is poly(tetramethylene oxide) glycol having a number average molecular weight of from about 600–2000.

6. The composition of claim 4 wherein the poly(alkylene oxide) glycol is ethylene oxide capped poly(propylene oxide) glycol having a number average molecular weight of 1500–2800 and an ethylene oxide content of 15–35% by weight.

7. The composition of claim 2, wherein the low melting point blocks are derived from polyester glycols.

8. The composition of claim 7 wherein the polyester glycol is poly)tetramethylene adipate) glycol or polycaprolactone glycol having a number average molecular weight of from 800–2500.

9. The composition of claim 2, wherein the multi-block copolyester elastomer consists essentially of high melting point blocks derived from 1,4-butanediol and a mixture of terephthalic acid and isophthalic acid or esters thereof, and los melting point blocks derives from poly(totramethylene oxide) glycol having a number average molecular weight of about 800–1200, the weight ratio of the high melting point blocks to low melting point blocks being from 1:2 to 1:0.5.

10. The composition of claim 2 wherein the multi-block copolyester elastomer has a melting point of from about 130°–180° C.

11. The composition of claim 2 comprising 30–70 parts by weight per 100 parts of polymer present of a multi-block copolyester elastomer and about 30–70 parts by weight per 100 parts of polymer present of a crosslinked polychloroprene.

12. The thermoplastic composition of claim 1 wherein the crosslinked polychloroprene is recovered from a latex in crosslinked form and dispersed in the copolyester by mixing.

13. The composition of claim 12 wherein the copolyester has high melting point blocks derived from ethylene glycol or 1,4-butanediol and terephthalic acid or mixtures thereof containing up to about 30% by weight isophthalic or phthalic acid.

14. The composition of claim 12 wherein the copolyester has low melting point blocks derived from poly(alkylene oxide) glycols having a carbon to oxygen ratio of about 2.0–4.3 and a number average molecular weight of from about 400–4000.

15. The composition of claim 14 wherein the poly(alkylene oxide) glycol is poly(tetramethylene oxide) glycol having a number average molecular weight of from about 600–2000.

16. The composition of claim 14 wherein the poly(alkylene oxide) glycol is ethylene oxide capped poly(propylene oxide) glycol having a number average molecular weight of 1500–2800 and an ethylene oxide content of 15–35% by weight.

17. The composition of claim 12 wherein the low melting point blocks are derived from polyester glycols.

18. The composition of claim 17 wherein the polyester glycol is poly(tetramethylene adipate) glycol or polycaprolactone glycol having a number average molecular weight of from 800–2500.

19. The composition of claim 12 wherein the multi-block copolyester elastomer consists essentially of high melting point blocks derived from 1,4-butanediol and a mixture of terephthalic acid and isophthalic acid or esters thereof, and low melting point blocks derived from poly(tetramethylene oxide) glycol having a number average molecular weight of about 800–1200, the weight ratio of the high melting point blocks to low melting point blocks being from 1:2 to 1:0.5.

20. The composition of claim 12 comprising 30–70 parts by weight per 100 parts of polymer present of a multi-block copolyester elastomer and about 30–70 parts by weight per 100 parts of polymer present of a crosslinked polychloroprene.

* * * * *